United States Patent
Hendricks, Sr.

(10) Patent No.: US 11,795,637 B2
(45) Date of Patent: Oct. 24, 2023

(54) ROBOTIC MAINTENANCE VEHICLE AND MODULES

(71) Applicant: PIONEER INDUSTRIAL SYSTEMS, LLC, Alvordton, OH (US)

(72) Inventor: Todd E. Hendricks, Sr., Monclova, OH (US)

(73) Assignee: PIONEER INDUSTRIAL SYSTEMS, LLC, Alvordton, OH (US)

( * ) Notice: Subject to any disclaimer, the term of this patent is extended or adjusted under 35 U.S.C. 154(b) by 332 days.

(21) Appl. No.: 17/189,841

(22) Filed: Mar. 2, 2021

(65) Prior Publication Data
US 2021/0277613 A1    Sep. 9, 2021

Related U.S. Application Data

(60) Provisional application No. 62/985,018, filed on Mar. 4, 2020.

(51) Int. Cl.
*E01F 9/70* (2016.01)
*G05D 1/00* (2006.01)
(Continued)

(52) U.S. Cl.
CPC .............. *E01F 9/70* (2016.02); *B25J 9/1697* (2013.01); *B60P 3/14* (2013.01); *B62D 33/06* (2013.01);
(Continued)

(58) Field of Classification Search
CPC . B25J 11/0075; B25J 5/00; B25J 5/007; B25J 5/06; B25J 9/162; B25J 9/1669
See application file for complete search history.

(56) References Cited

U.S. PATENT DOCUMENTS 9,347,185 B2    5/2016  Reda
9,724,877 B2    8/2017  Flitsch et al.
(Continued)

FOREIGN PATENT DOCUMENTS

CA    2914265 A1    12/2014
CA    2963236 A1    12/2014
(Continued)

OTHER PUBLICATIONS https://vimeo.com/588534095?embedded=true&source=vimeo_logo&owner=4527648.
(Continued)

*Primary Examiner* — Nicholas Kiswanto
(74) *Attorney, Agent, or Firm* — Jacob M. Ward; Ward Law Office LLC (57) ABSTRACT

The robotic maintenance vehicle (RMV) has a propulsion system, a control system, an electrical power source, a maintenance module, a multi-axis robot, an optical system, and a location translator. The maintenance module is configured to hold different kinds of road maintenance materials. The multi-axis robot is configured to convey the road maintenance material from either the maintenance module to the road, the road to the maintenance module, or both. The optical system and the location translator are configured to be controlled by the control system and operate in conjunction to instruct the multi-axis robot where to pick up and/or place the road maintenance material. The multi-axis robot is configured to be selectively coupled to a distal arm tool.

17 Claims, 11 Drawing Sheets

(51) Int. Cl.
    *B25J 9/16*           (2006.01)
    *B60P 3/14*           (2006.01)
    *B62D 53/00*         (2006.01)
    *E01C 23/09*         (2006.01)
    *B62D 33/06*         (2006.01)

(52) U.S. Cl.
    CPC .......... *B62D 53/00* (2013.01); *E01C 23/0973* (2013.01); *G05D 1/0094* (2013.01); *B60Y 2200/92* (2013.01)

(56) References Cited

U.S. PATENT DOCUMENTS

| | | | |
|---|---|---|---|
| 9,972,205 | B2 | 5/2018 | Beaulieu |
| 9,987,792 | B2 | 6/2018 | Flitsch et al. |
| 10,124,359 | B2 * | 11/2018 | Raman .................. B05B 13/005 |
| 10,201,932 | B2 | 2/2019 | Flitsch et al. |
| 10,525,631 | B2 | 1/2020 | Flitsch et al. |
| 10,661,505 | B2 | 5/2020 | Flitsch et al. |
| 10,836,107 | B2 | 11/2020 | Flitsch et al. |
| 11,194,306 | B2 | 12/2021 | Flitsch et al. |
| 11,358,169 | B2 * | 6/2022 | Micucci, Jr. .......... B05B 13/005 |
| 2007/0037484 | A1 * | 2/2007 | Ohishi ...................... B08B 7/02 451/6 |
| 2016/0032540 | A1 | 2/2016 | Reda |
| 2016/0318187 | A1 * | 11/2016 | Tan ........................ B25J 9/1697 |
| 2017/0023266 | A9 | 1/2017 | Baruch |
| 2017/0154524 | A1 | 6/2017 | Beaulieu |
| 2018/0342153 | A1 | 11/2018 | Ellis et al. |
| 2020/0131725 | A1 * | 4/2020 | Hung ................... G06V 20/588 |

FOREIGN PATENT DOCUMENTS

| | | |
|---|---|---|
| CN | 105339551 A | 2/2016 |
| EP | 3014022 A1 | 5/2016 |
| JP | 6510509 B2 | 5/2019 |
| KR | 20120004619 A | 1/2012 |
| KR | 101218494 B1 | 1/2013 |
| WO | 2013068716 A1 | 5/2013 |

OTHER PUBLICATIONS https://vimeo.com/573778242?embedded=true&source=vimeo_logo&owner=4527648.

https://vimeo.com/490867777?embedded=true&source=vimeo_logo&owner=4527648.

https://vimeo.com/496730676?embedded=true&source=vimeo_logo&owner=4527648.

https://www.youtube.com/watch?v=-t9TqiPosKM.

Written Opinion of the International Searching Authority dated Jun. 24, 2022.

* cited by examiner

ROBOTIC MAINTENANCE VEHICLE AND MODULES

CROSS-REFERENCE TO RELATED APPLICATIONS

This application claims the benefit of U.S. Provisional Application. No. 62/985,018 filed on Mar. 4, 2020. The entire disclosure of the above application is incorporated herein by reference.

FIELD

The present disclosure relates to road maintenance technology, more particularly, robotic systems for use in construction or maintenance of roads.

INTRODUCTION

This section provides background information related to the present disclosure which is not necessarily prior art.

There are several problems facing today's highway and road maintenance teams. These include, but are not limited to, the following examples. There are safety issues, where workers can be exposed to high-speed traffic, distracted drivers, hazardous materials and equipment, and poor climate conditions. Ergonomic issues exist as maintenance work can involve several miles of walking and heavy lifting of material and equipment. Undesirably, this can lead to muscle strain, muscle imbalances, and fatigue. Efficiency issues exist relating to time spent training employees, preparing for zone control, setting up work zones, taking down work zones, and breaks. This wasted time reduces the overall time available for efficient work. Labor requirements place certain demands on projects, where road maintenance can take multiple people to set up, maintain zones, patrol zones, do the actual work, act as spotters, maintain safety, and maintain equipment. In addition, it can be difficult to find and keep good workers due to the hard-manual labor required and the rise of unemployment or shortage thereof. Traffic issues relate to where traffic can be hindered due to the length of the work zones and the amount of time needed to complete the maintenance. Undesirably, this can damage local economies. Equipment limitations can be present where road maintenance projects require multiple trucks and dedicated equipment to perform a single task, such as sealing cracks, setting cones, painting lines or arrows, etc. This equipment can be cost prohibitive, especially for smaller contractors. Material usage considerations include where different operators may apply too little or too much material for a given task. This can result in suboptimal coverage resulting in waste. Quality issues can occur, as most road maintenance generally involves manual labor and judgment based decisions, hence the quality of the end product can be inconsistent due to the skill of the individual worker. Environmental issues can be present, as with multiple vehicles, chemicals, and fuels being used in road maintenance, there is always the risk of an environmental accident. In addition, construction or maintenance vehicles and equipment emit carbon and heat into the atmosphere. Finally, other labor issues can impact road maintenance, including worker no-shows, vacations, scheduled breaks, allowing an operator to set a work pace, the high cost of benefits, as well as insurance and workers compensation claims.

There is a continuing need for a robotic maintenance vehicle and modules that improve the quality of road maintenance. Desirably, functions of the robotic maintenance vehicle and modules can be automated to optimize road maintenance tasks, thereby improving worker safety and efficiency while more consistently tending transportation and community infrastructure.

SUMMARY

In concordance with the instant disclosure, a robotic maintenance vehicle and modules that improve the quality of road construction and/or maintenance, and which functions of the robotic maintenance vehicle and modules can be automated to militate against human error, has been surprisingly discovered.

In certain embodiments, a robotic maintenance vehicle (RMV) includes a vehicle platform, a control system, an electrical power source, a multi-axis robot, an optical system, and a location translator. The RMV may further include a maintenance module. The vehicle platform may include a propulsion system configured to propel the vehicle platform. The control system may be configured to control the vehicle, the maintenance module, the electrical power source, the multi-axis robot, the optical system, the location translator, or a combination thereof. The maintenance module may be configured to hold a road maintenance material. Non-limiting examples of the road maintenance material may include traffic cones, road sealant (e.g., tar), and paint. The multi-axis robot and/or control system may be powered by the electrical power source. The multi-axis robot may be configured to convey the road maintenance material from either the maintenance module to the road, the road to the maintenance module, or both. The multi-axis robot may also be configured to be selectively coupled to a distal arm tool. Non-limiting examples of the distal arm tool may include a sealant dispenser, a cone picker, a saw, a grinder, a painter sprayer, and a scanner. The optical system may be configured to identify a road feature. Non-limiting examples of the road feature may include a traffic cone, a crack, a pothole, a painted signal, and a reflective pavement marker. The location translator may be configured to translate a location of the road feature identified by the optical system to a working area of the multi-axis robot.

In certain embodiments, the RMV may include another multi-axis robot powered by the electrical power source. The another multi-axis robot may be configured to convey the road maintenance material from either the maintenance module to the road, the road to the maintenance module, or both. The optical system may be configured to identify another road feature sequentially or simultaneously. The location translator may be configured to translate a location of the another road feature identified by the optical system to a working area of the another multi-axis robot.

In certain embodiments, the present technology includes various ways of using the RMV. Examples include various methods where an RMV is provided that includes a vehicle, a control system, an electrical power source, a maintenance module, a multi-axis robot, an optical system, and a location translator. Such methods may include performing a road maintenance operation. Examples of the road maintenance operation may include one of (1) conveying the road maintenance material from the road to the maintenance module, (2) conveying the road maintenance material from the maintenance module to the road, and (3) conveying the road maintenance material from the road to the maintenance module and conveying the road maintenance material from the maintenance module to the road.

In certain embodiments, the present technology can provide a base unit truck or trailer with a robot, a controller, an electrical power source, an optical system, and a location translator that can accept various modules to greatly improve the way highway construction or maintenance is currently done. Non-limiting examples of these modules can include a crack sealer, pothole filler, painter, cone setter and/or cone picker, post setter, sign setter, vacuum cleaner, core sampler, grinder, saw, reflector inserter, inspection and marking systems. By creating a universal robotic maintenance vehicle (RMV) base unit with swappable modules, the present technology can greatly reduce the problems faced by today's road construction or maintenance workforce. Solutions to the problems listed above are outlined below:

1) SAFETY: The RMV only requires a small crew. In addition, the robot of the RMV will be doing the manual labor. Therefore, workers can be removed from dangerous traffic areas, which can improve safety and reduce risks.
2) ERGONOMICS: Since the RMV will be doing the manual labor, workers will be less likely to be exposed to poor ergonomics. Desirably, this can reduce physically strenuous situations and insurance claims.
3) EFFICIENCY: The RMV may be configured to perform certain tasks and repeat them on a regular basis. Desirably, this can result in materials being applied consistently and accurately. This may also reduce the amount of training required for workers.
4) LABOR INTENSIVE and SHORTAGE: The RMV can greatly reduce the human labor required for a given maintenance project. For example, the RMV with the cone setter module could quickly set up a zone with no workers exposed to traffic followed by a second RMV moving down the highway using the optical system to find and measure cracks, the location translator to align the visual data with the robot, and the robot dispensing sealant to fill cracks. The tandem RMVs with two drivers can do a job that typically takes several trucks with workers walking along while one worker is controlling the dispense hose and nozzle. Desirably, this can greatly reduce labor and free up workers to fill in for other positions, instead of hiring and training new employees.
5) TRAFFIC FLOW: Again, with the example above of the RMV with Cone Setter and Sealant Modules working in tandem, a much shorter work zone may be created. The lead RMV could set the cones and seal the cracks in the road from one vehicle while a second chase RMV keeps traffic shifted over and automatically picks up the cones as it follows a desired distance behind the lead RMV. Thus, creating a moving working zone and possibly reducing the required working distance. This much shorter moving work zone may greatly reduce traffic flow and backups.
6) EQUIPMENT REQUIREMENTS: An RMV with modules may greatly reduce the number of specialty or dedicated vehicles and equipment required to perform specific tasks. Again, by keeping the operator in the RMV and using a robot for labor, the overall pieces of equipment and trucks required for a project may be minimized.
7) MATERIAL USAGE: Using automated controls and a robot controlling precisely where and how much material is being used for a specific application may greatly reduce the amount of material used, such as sealer, filler, or paint.
8) QUALITY: Just as with material usage, the automated controls and the robot controlling precisely where and how much material is used for a specific application may greatly improve the quality of the process, such as sealing, filling, or painting.
9) ENVIRONMENTAL: By reducing the number of vehicles and controlling the processes automatically, amounts of materials, chemicals, and fuels used may be much less. The use of automated controls may also reduce the risk of an environmental spills. The use of the RMV and modules in road maintenance may require fewer vehicles emitting carbon and heat into the atmosphere, therefore the impact on climate change may greatly be reduced.
10) OTHER LABOR PROBLEMS: With a robot performing the manual labor, human errors may be reduced as well as challenges of maintaining workers not showing up for work, scheduling vacations, taking breaks, the rising cost of benefits, production rates variance, worker comp and insurance claims.

As can be seen with the advancement of automation and robotics, the RMV provided by the present technology, where modules can be swapped in and out, will help to eliminate or reduce the problems listed above. The various RMV embodiments disclosed herein can provide optimized performance for infrastructure, construction, or maintenance and corresponding monetary savings to states, counties, cities, towns, and townships.

Further areas of applicability will become apparent from the description provided herein. It should be understood that the description and specific examples are intended for purposes of illustration only and are not intended to limit the scope of the present disclosure.

DRAWINGS

The above, as well as other advantages of the present disclosure, will become readily apparent to those skilled in the art from the following detailed description, particularly when considered in the light of the drawings described herein.

DETAILED DESCRIPTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping, or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9,1-8,1-3,1-2,2-10, 2-8,2-3,3-10,3-9, and so on.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the FIGS. is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present technology is drawn to a robotic maintenance vehicle (RMV) that includes a vehicle having a propulsion system and a control system, an electrical power source, a multi-axis robot, an optical system, and a location translator. The RMV may further include a maintenance module. The propulsion system may be configured to propel the vehicle. The control system may be configured to control the vehicle, the multi-axis robot, the optical system, the location translator, and the maintenance module. The maintenance module may be configured to hold a road maintenance material. Non-limiting examples of the road maintenance material may include traffic cones, road tar, road sealant, and paint. The multi-axis robot and/or controller may be powered by the electrical power source. The multi-axis robot may be configured to convey the road maintenance material from either the maintenance module to the road, the road to the maintenance module, or both. The multi-axis robot may be configured to be selectively coupled to a distal arm tool. Non-limiting examples, of the distal arm tool may include a sealant dispenser, a cone picker, a saw, a grinder, a chisel, and a scanner. The optical system may be configured to identify a road feature. Non-limiting examples of the road feature may include a traffic cone, a crack, a pothole, a painted signal, and a reflective signal. The location translator may be disposed on an underside of the vehicle and may be configured to translate a location of the road feature identified by the optical system to a work area of the multi-axis robot.

The RMV can further include the following aspects. The vehicle platform may include a chassis and a plurality of wheels. Examples of the vehicle platform may include a trailer, a truck including a propulsion system configured to propel the RMV, and a truck having a trailer coupled to the truck. The propulsion system may include an internal combustion engine, an electric motor, and combinations thereof. The vehicle may further include an operator cab for an operator to control the vehicle. The control system may include a programmable controller, a computer, or a combination thereof. The computer may be an industrial computer. Advantageously, the industrial computer is more durable than generic computers. In a specific example, the electrical power source may include an electric generator. In an alternative specific example, the electrical power source may include using the electrical system of the vehicle. The multi-axis robot may include different brands, sizes, or models of robots or combinations thereof. For instance, the multi-axis may be a six-axis robot. A non-limiting example of the multi-axis robot may be a FANUC R2000/210F. The optical system may include a digital camera, a laser, or a combination thereof. As a non-limiting example, the optical system may include a dual rear backup camera and site cameras with an in-cab monitor. The location translator may include a linear encoder. The work area of the multi-axis robot may be located adjacent to a front edge of the RMV, a right side of the RMV, a left side of the RMV, and/or a rear end of the RMV. The work area of the multi-axis robot may be a three-dimensional volume of a predetermined space surrounding the multi-axis robot. The RMV may also include a plurality of work areas.

In certain embodiments, the computer of the control system includes a processor and a memory. The memory may be in communication with the processor. The memory may include a tangible, non-transitory computer readable memory with processor-executable instructions stored thereon. The processor-executable instructions may be utilized by the control system to carry out the desired functions of the optical system, the location translator, the multi-axis robot, the maintenance module, the electrical power source, the vehicle, and combinations thereof.

In certain embodiments, the road maintenance material may include a plurality of traffic cones. The multi-axis robot may be configured to convey the traffic cones from either the maintenance module to the road, the road to the maintenance module, or both. The multi-axis robot may include a clamping distal arm tool configured to releasably clasp one of the traffic cones. In a specific example, the clamping distal arm tool may include a clamp. The clamp may be configured to clasp one of the traffic cones. In a more specific example, the clamp may have a pair of clamping members actuated along a substantially horizontal axis. In an even more specific example, the clamping distal arm tool may include a vertical clamp and a horizontal clamp. The vertical clamp may be configured to releasably clasp a traffic cone disposed substantially vertical on a surface within the work area of the multi-axis robot. The horizontal clamp may be configured to releasably clasp a traffic cone disposed substantially horizontal on a surface within the work area of the multi-axis robot. For example, a traffic cone may be disposed in a substantially horizontal position where the traffic cone has been knocked over. Other gripping methods may include, but are not limited to, other mechanical devices, a vacuum, a magnet, or other means of holding the road maintenance material within the scope of the present disclosure.

In certain embodiments, the RMV may include another multi-axis robot powered by the electrical power source. The another multi-axis robot may be configured to convey the road maintenance material from either the maintenance module to the road, the road to the maintenance module, or both. The optical system may be configured to identify another road feature. The location translator may be configured to translate a location of the another road feature identified by the optical system to a working area of the another multi-axis robot. In a specific example, the another multi-axis robot may be configured to convey the traffic cones from either the maintenance module to the road, the road to the maintenance module, or both.

In certain embodiments, the road maintenance material may include a sealant and the multi-axis robot may be configured to convey the sealant from the maintenance module to the road. The road feature identified by the optical system may include a crack in a surface of the road. In one example, the sealant module may include a combination of vision equipment and laser equipment. As a non-limiting example, the optical system may include a SICK RANGER3 3D camera. The optical system may further include an optical mapping module configured to map the crack. The optical mapping module may be configured to record the crack and analyze measurements of the crack based on the recording. The recording may be obtained through photographs, video, lasers, or a combination of thereof. Non-limiting examples of the measurements may include a width of the crack, a length of a crack, a depth of the crack, and a volume open space within the crack. The location translator may be configured to relay the location, the orientation, and the measurements of the crack from the optical mapping module to the multi-axis robot. The multi-axis robot may be configured to convey the sealant from the maintenance module to the crack mapped by the optical mapping module. In a specific example, the optical mapping module may include a shroud configured to substantially enclose the crack in the surface of the road and militate against ambient light entering an area defined within the shroud. The optical mapping module may further include a member having a laser, a digital camera, or both. In a non-limiting example, each of the processes, the controls, and the communication of the multi-axis robot, the optical system, the location translator, the maintenance module, and combination thereof are facilitated by the control system.

In certain embodiments, the control system may be configured to selectively instruct the multi-axis robot which individual cracks to seal based on the measurements from the optical mapping module. As a non-limiting example, the control system may be configured to instruct the multi-axis robot to fill cracks greater than ¼" wide and greater than ¼" deep. With continued reference to the non-limiting example, the control system may be configured to instruct the multi-axis robot to not fill cracks greater than 1" wide and 1" deep. It should be appreciated that a skilled artisan may select other suitable units of measurements or ways of selectively filling cracks, within the scope of the present disclosure.

The multi-axis robot may include a sealant distal arm tool fluidly coupled to the road maintenance material. The sealant distal arm tool may be configured to dispense the sealant. In a specific example, the sealant distal arm tool may have a spring actuated dampener to account for variations in the road surface. The sealant distal arm tool may include a hollow cylinder extending for a predetermined length to support a modular material fluid hose and a nozzle arrangement. Advantageously, the predetermined length of the hollow cylinder supports the hose in circumstances where the multi-axis robot may not be capable of extending to a desired area.

In certain embodiments, the RMV may further include an airstream module configured to provide an airstream to blow debris from the road and from cracks on a surface of the road. As a non-limiting example, the airstream module may be an oscillating air knife fixedly disposed on the vehicle or of which could be selectively movable by the multi-axis robot. Where the airstream module is selectively movable by the multi-axis robot, the airstream module may selectively blow debris from individual cracks.

In certain embodiments, the RMV may include barriers, lights, signage, scanners, and alert systems. The lights, scanners, and alert systems may be configured to notify a human operator where an undesired object enters the work area of the multi-axis robot and/or control the multi-axis robot for automatic speed reduction and/or emergency stopping action. Non-limiting examples of the undesired object may include a person, an animal, and an automobile. In a specific example, the alert system may provide a visual cue, an auditory cue, or both to notify the human operator and initiate controlled motion inhibiters. The barrier and the signage may be configured to notify the human operator of a boundary of the work area of the multi-axis robot. In another specific example, the RMV may further include a kill switch to shut off the power to the multi-axis robot.

In certain embodiments, the RMV may have a maintenance module and a multi-axis robot configured to convey a maintenance material. The RMV may further have another maintenance module and another multi-axis robot configured to convey a different maintenance material. For example, the RMV may be configured to convey a traffic cone to and from the maintenance module. The RMV may also be configured to convey a sealant to and from the another maintenance module. It should be appreciated any number of maintenance modules and multi-axis robots may be utilized on the RMV.

In certain embodiments, a plurality of RMVs may be utilized together. For example, a first RMV could be configured to blow debris out of any cracks in a surface and also set cones on the surface. A second RMV could be configured to find, measure, and fill the cracks in the surface. A third RMV could be configured to pick up the cones from the surface. A skilled artisan may select other maintenance tasks to utilize a plurality of RMVs, within the scope of the present disclosure.

Turning now the accompanying figures provided herewith, particular embodiments of the present technology are shown.

Figure 1:
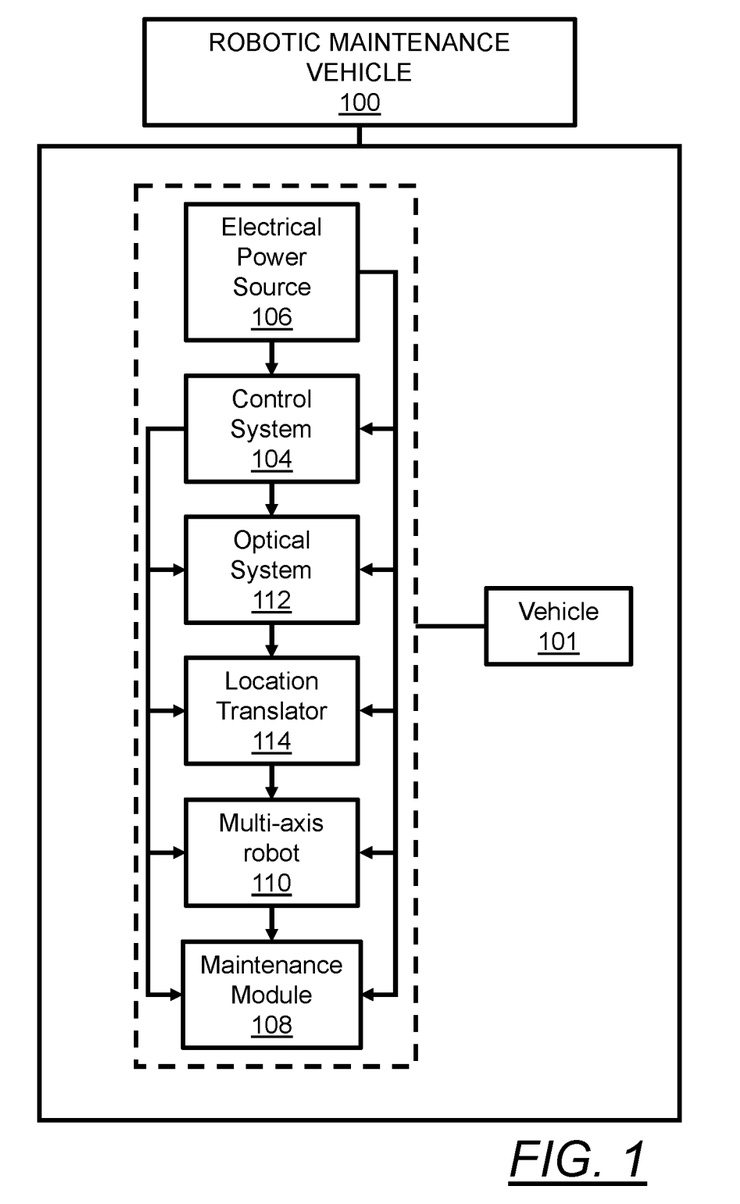
FIG. 1 is a schematic illustration of components of a Robotic Maintenance Vehicle (RMV)
Figure 2:
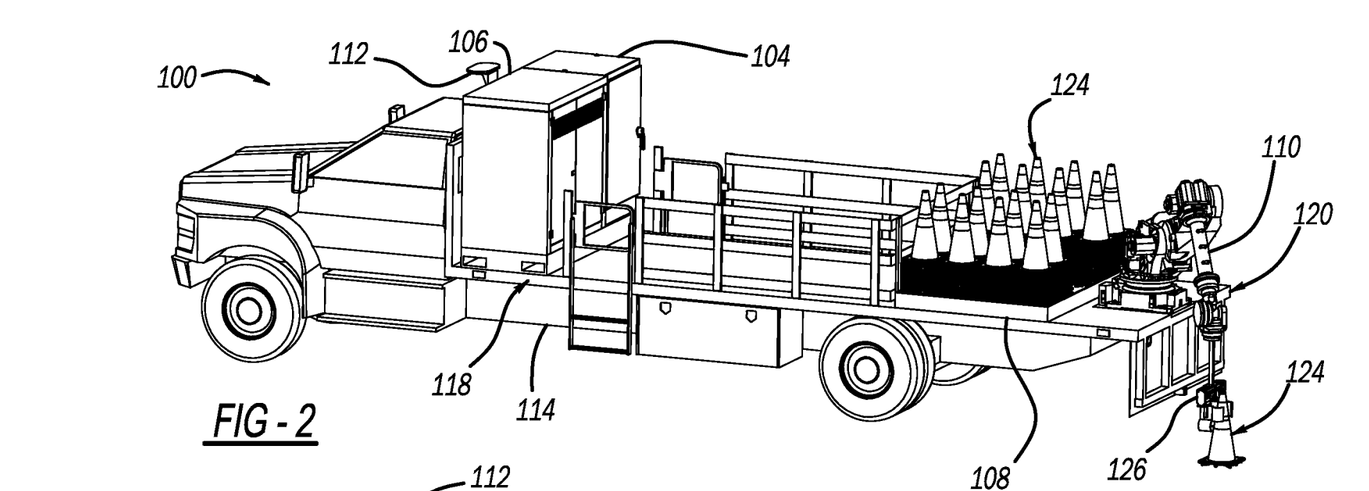
FIG. 2 is a rear perspective view of a first embodiment of the RMV, depicted with a cone picking module, according to one embodiment of the present disclosure.
Figure 3:
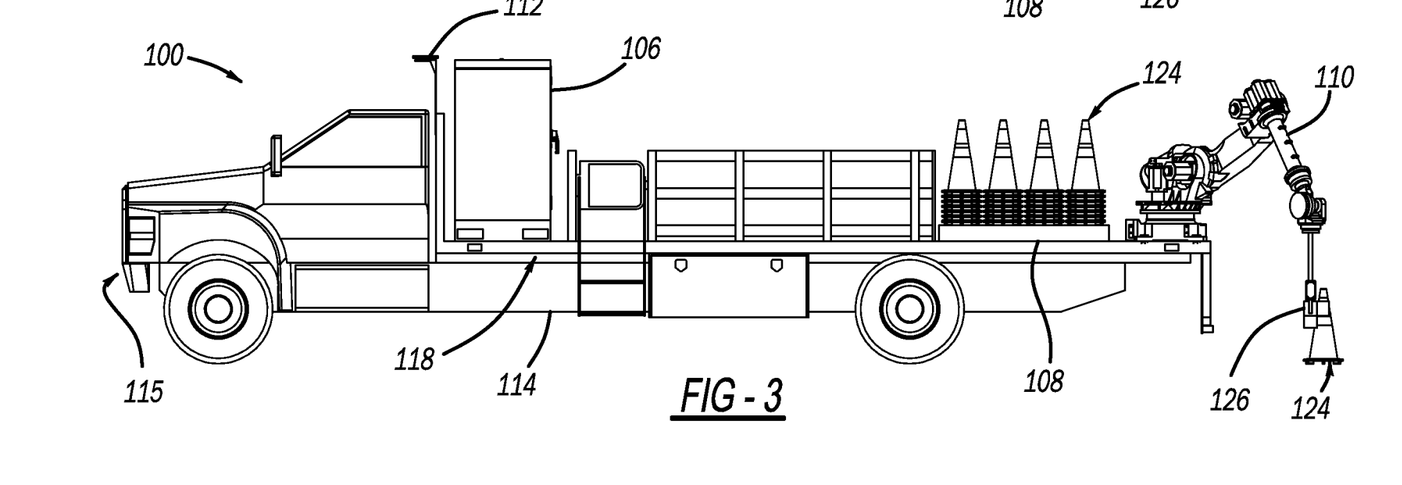
FIG. 3 is a left side elevational view of the first embodiment of the RMV, as shown in FIG. 2.
Figure 4:
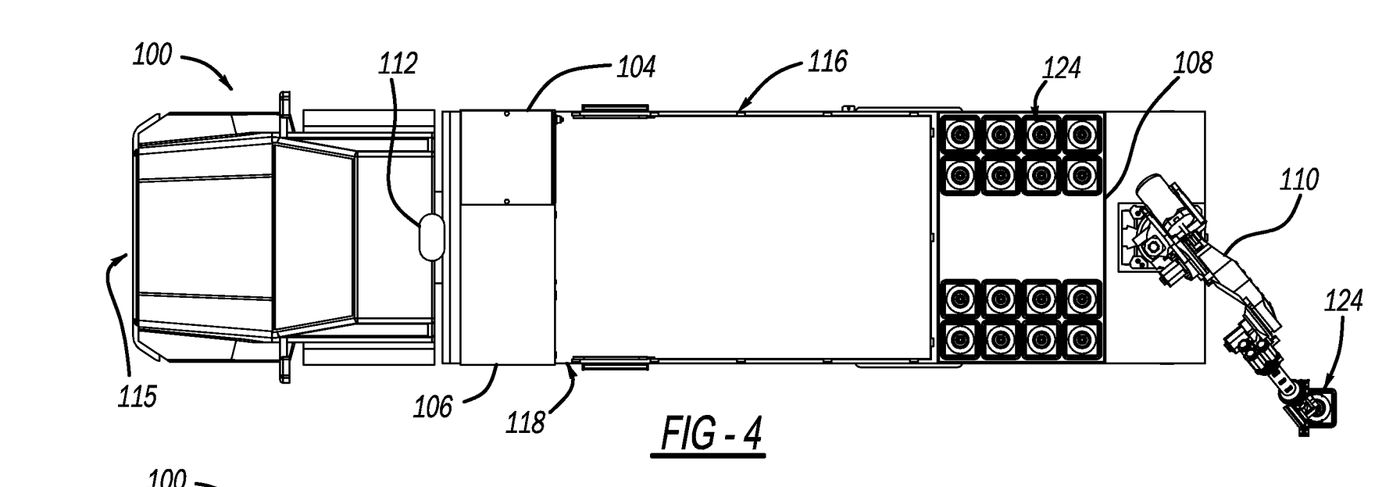
FIG. 4 is a top plan view of the first embodiment of the RMV, as shown in FIGS. 2-3.
Figure 5:
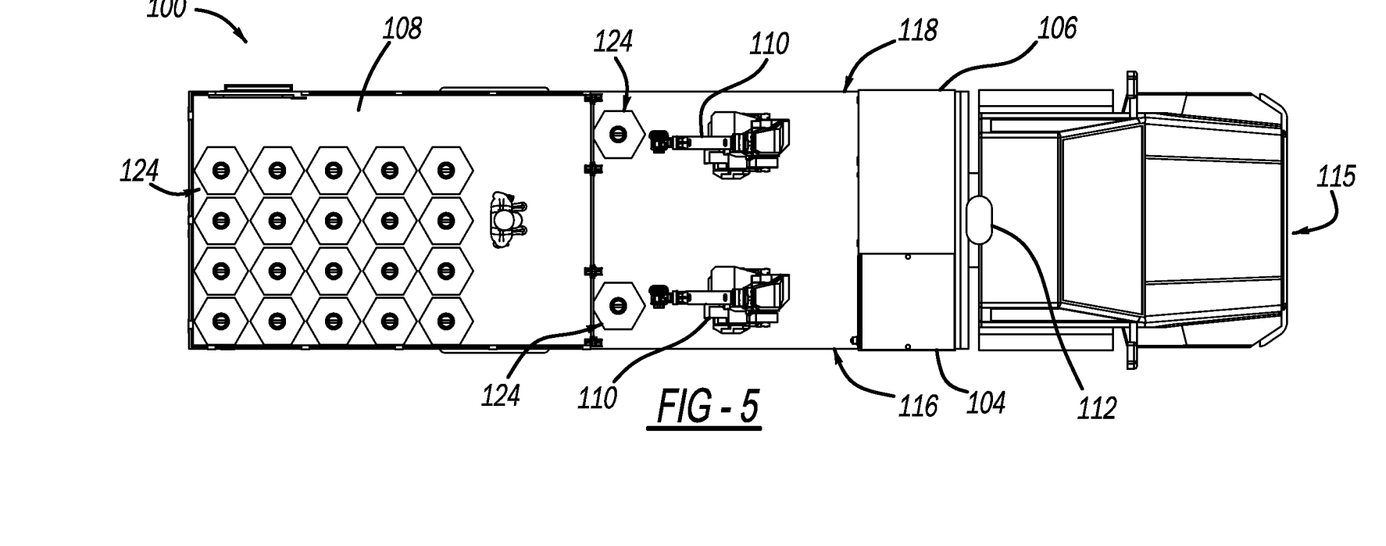
FIG. 5 is a top plan view of a second embodiment of the RMV, depicted with a plurality of multi-axis robots and a plurality of cone picking modules.
Figures 6, 7:
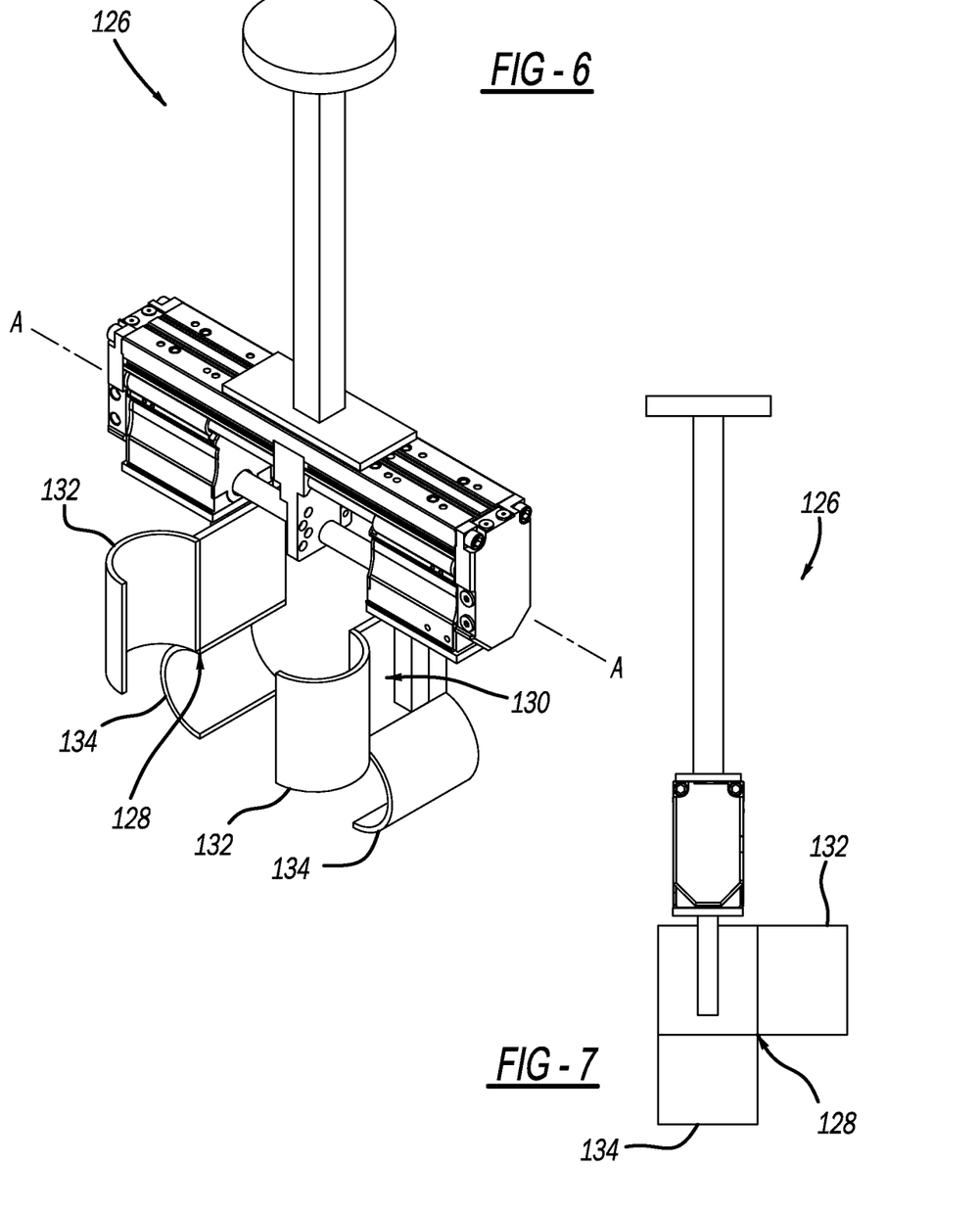
FIG. 6 is a top perspective view of a clamping distal arm tool, according to one embodiment of the present disclosure.
FIG. 7 is a left side elevational view of the clamping distal arm tool, shown in FIG. 6.
Figure 8:
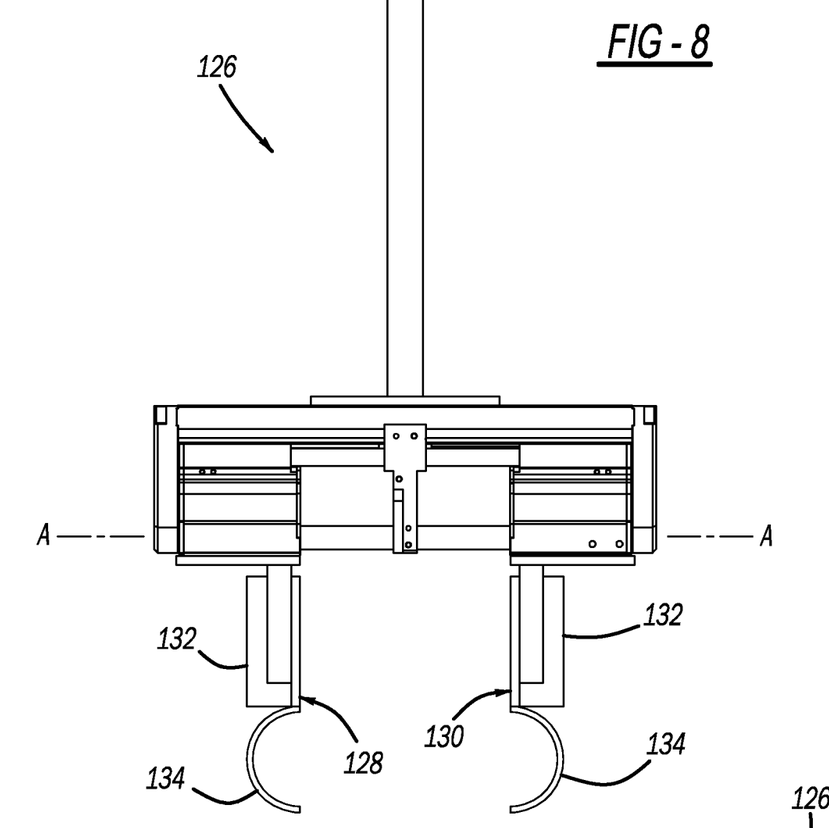
FIG. 8 is a front elevational view of the clamping distal arm tool, shown in FIGS. 6-7.
Figure 9:
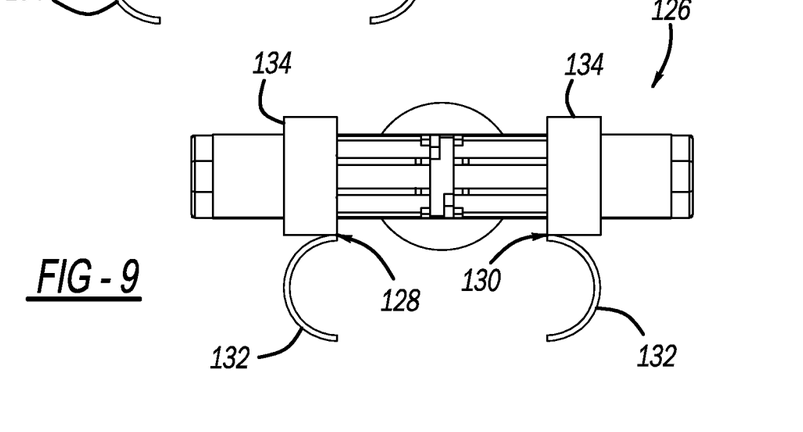
FIG. 9 is a top plan view of the clamping distal arm tool, shown in FIGS. 6-8.
Figure 10:
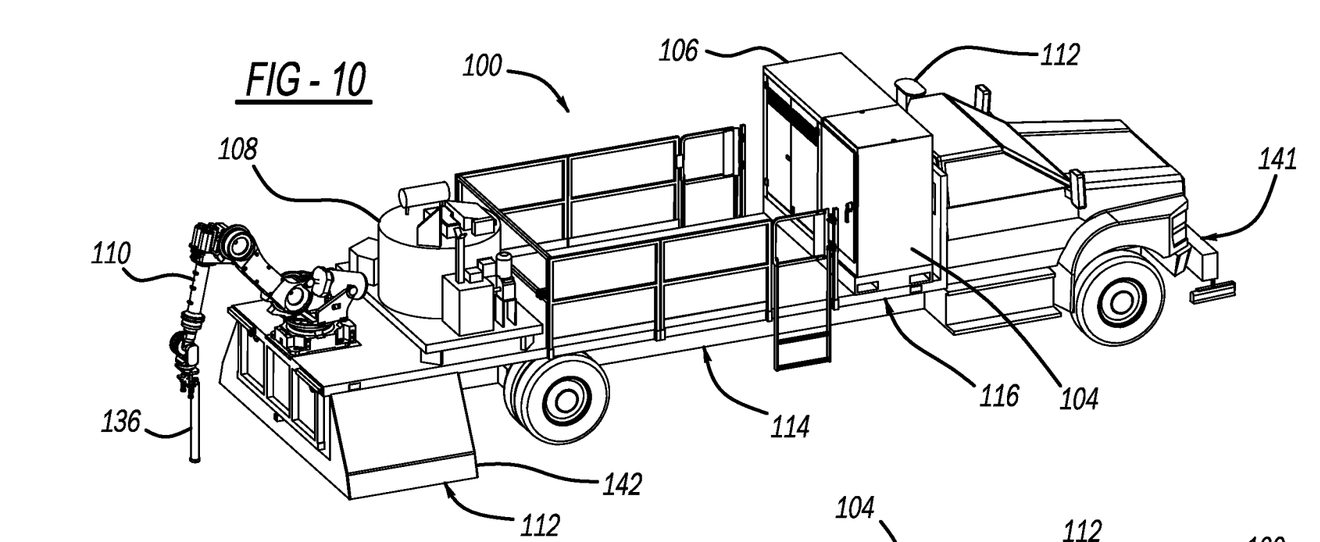
FIG. 10 is a rear perspective view of a third embodiment of the RMV, depicted with a sealant module and an optical mapping module.
Figure 11:
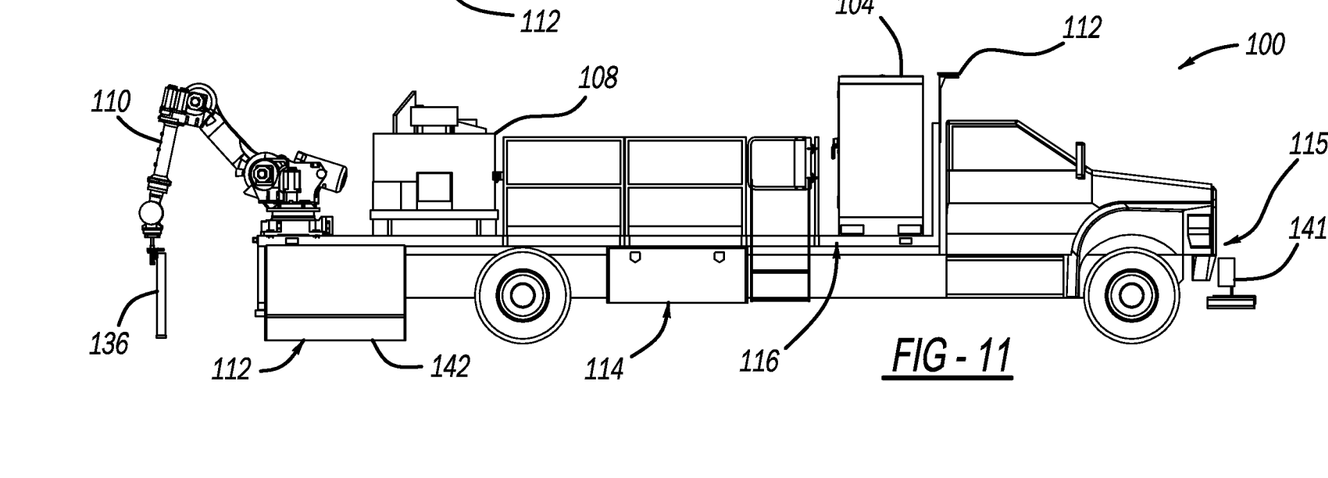
FIG. 11 is a side elevational view of the third embodiment of the RMV, shown in FIG. 10.
Figure 12:
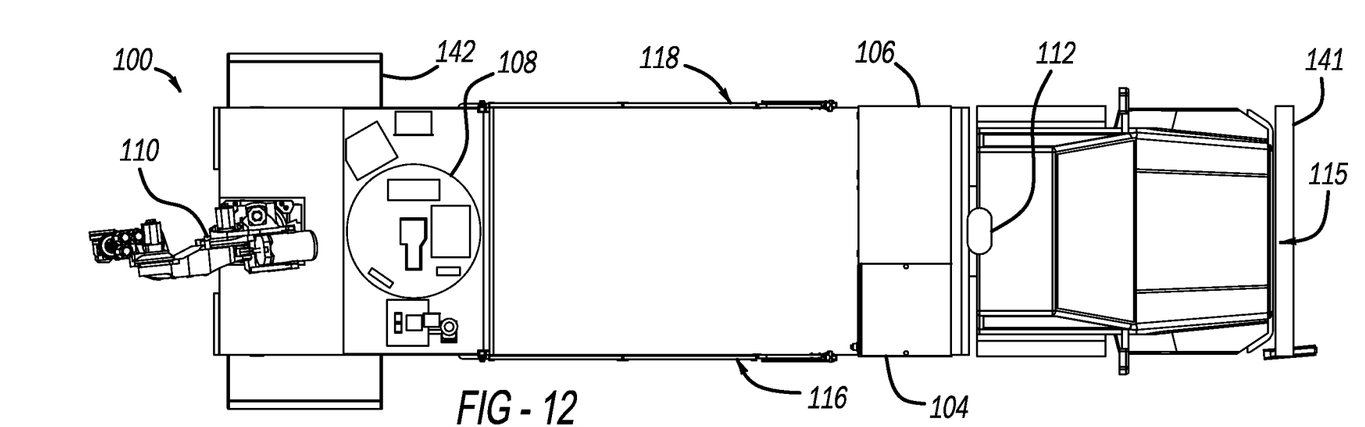
FIG. 12 is a top plan view of the third embodiment of the RMV, shown in FIGS. 10-11.
Figure 13:
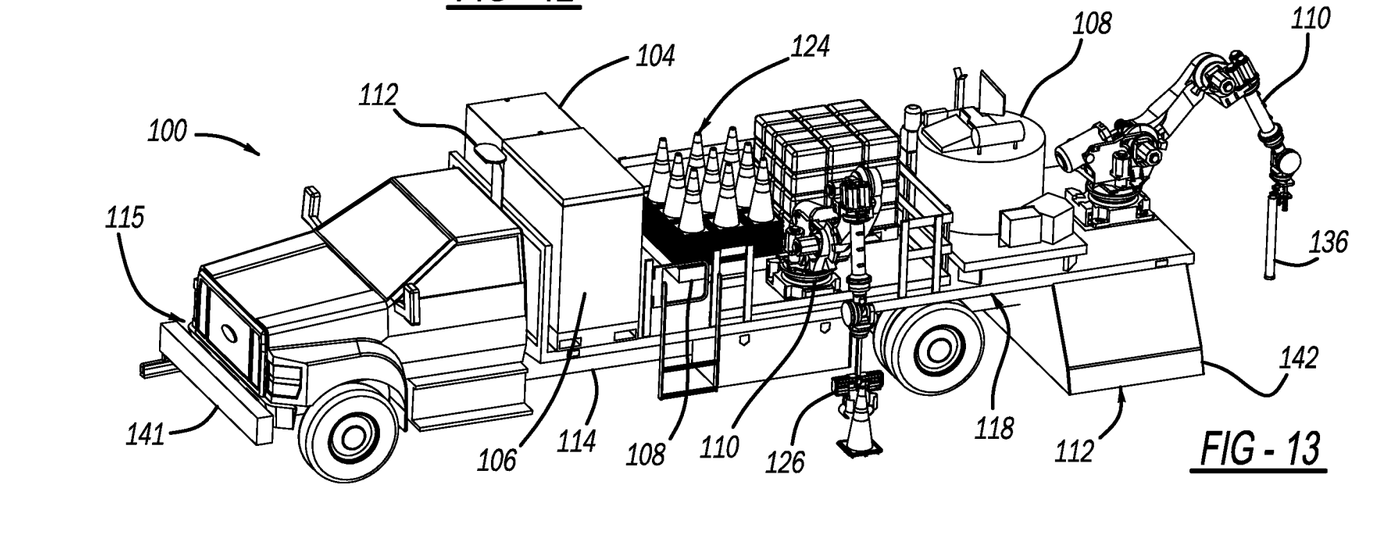
FIG. 13 is a front perspective view of a fourth embodiment of the RMV, depicted with a plurality of multi-axis robots, a cone picking module, and a sealant module, according to another embodiment of the present disclosure.
Figure 14:
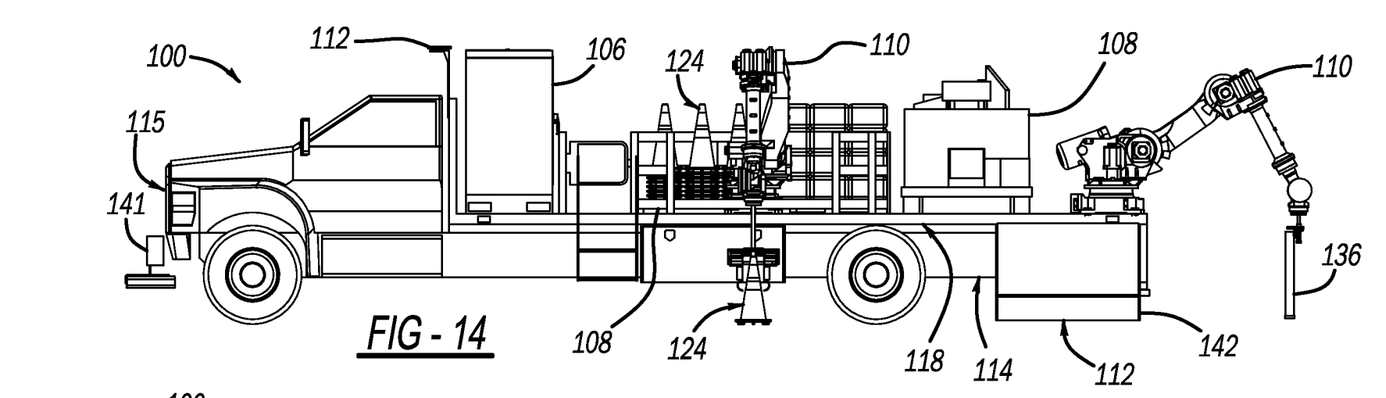
FIG. 14 is a left side elevational view of the fourth embodiment of the RMV, as shown in FIG. 13.
Figure 15:
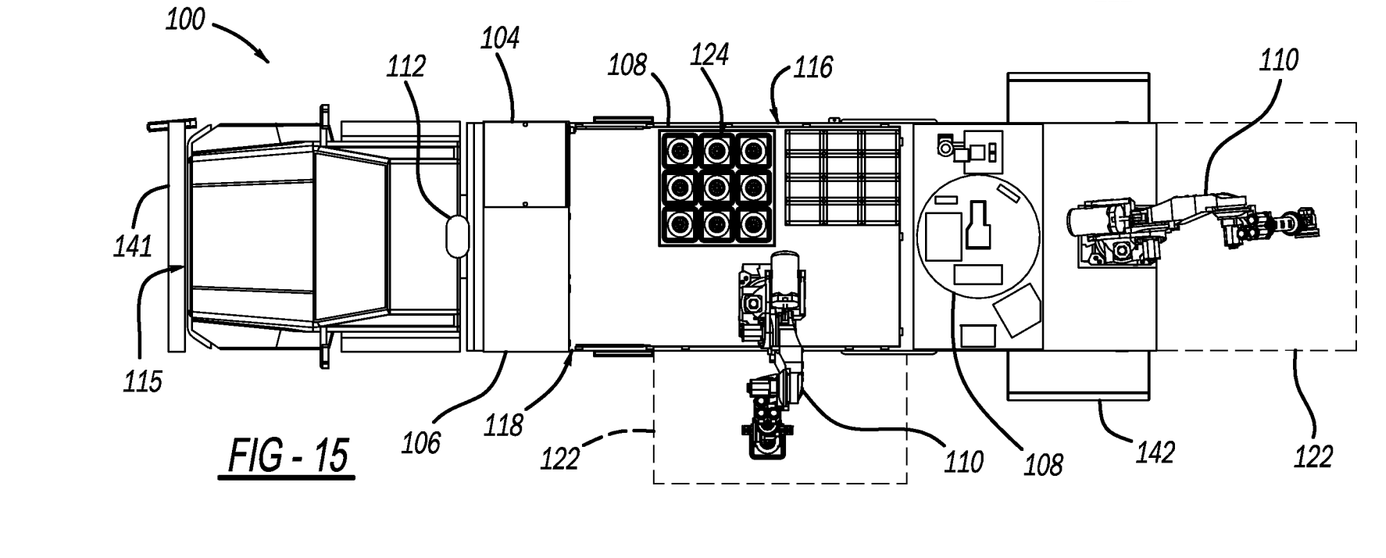
FIG. 15 is a top plan view of the fourth embodiment of the RMV, as shown in FIGS. 13-14.
Figure 16:
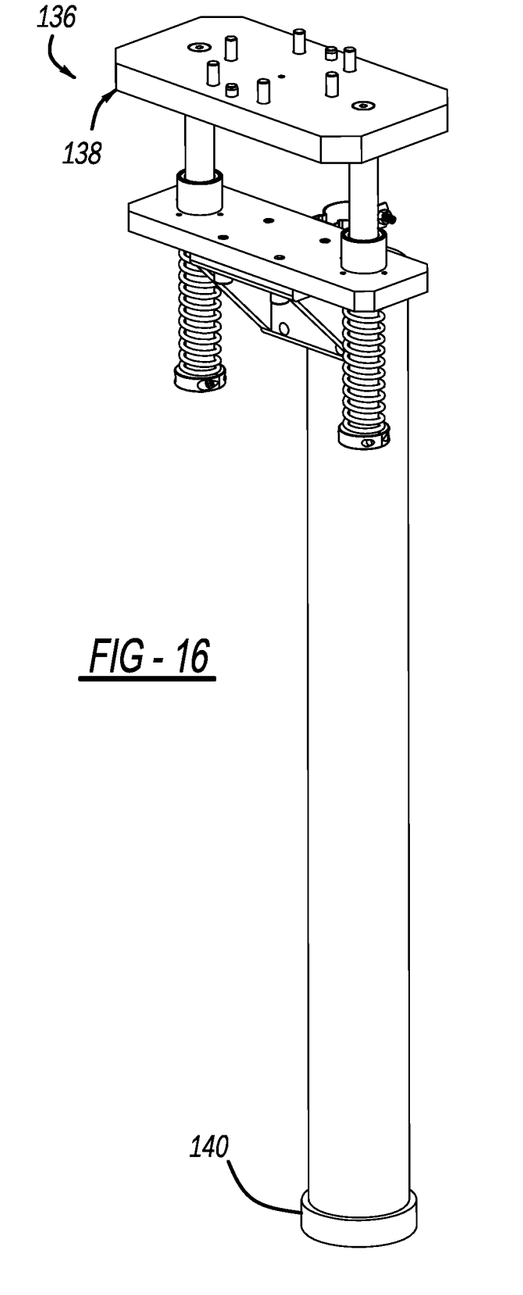
FIG. 16 is a top perspective view of a sealant distal arm tool, according to another embodiment of the present disclosure.
Figure 17:
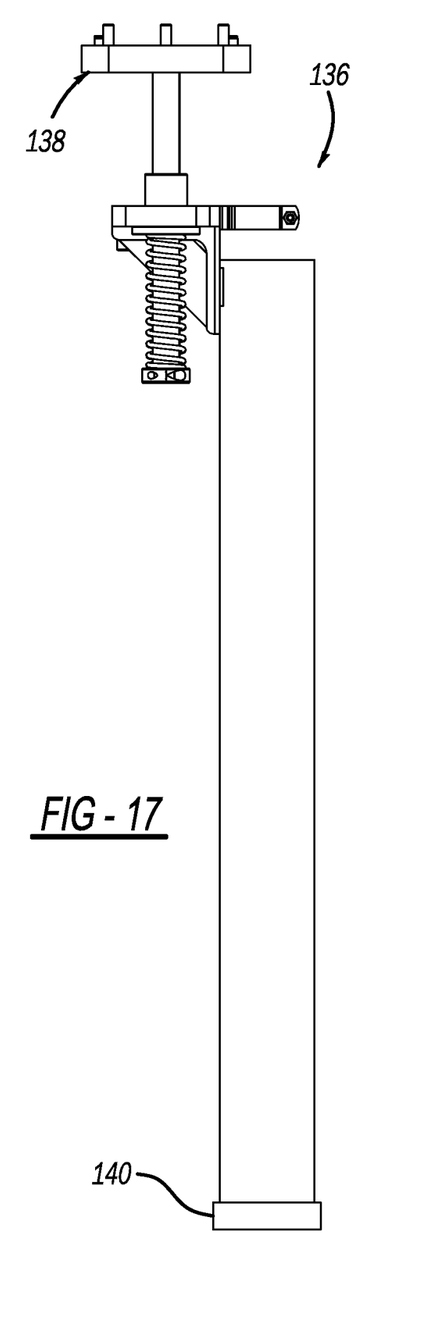
FIG. 17 is a right side elevational view of the sealant distal arm tool, as shown in FIG. 16.
Figure 18:
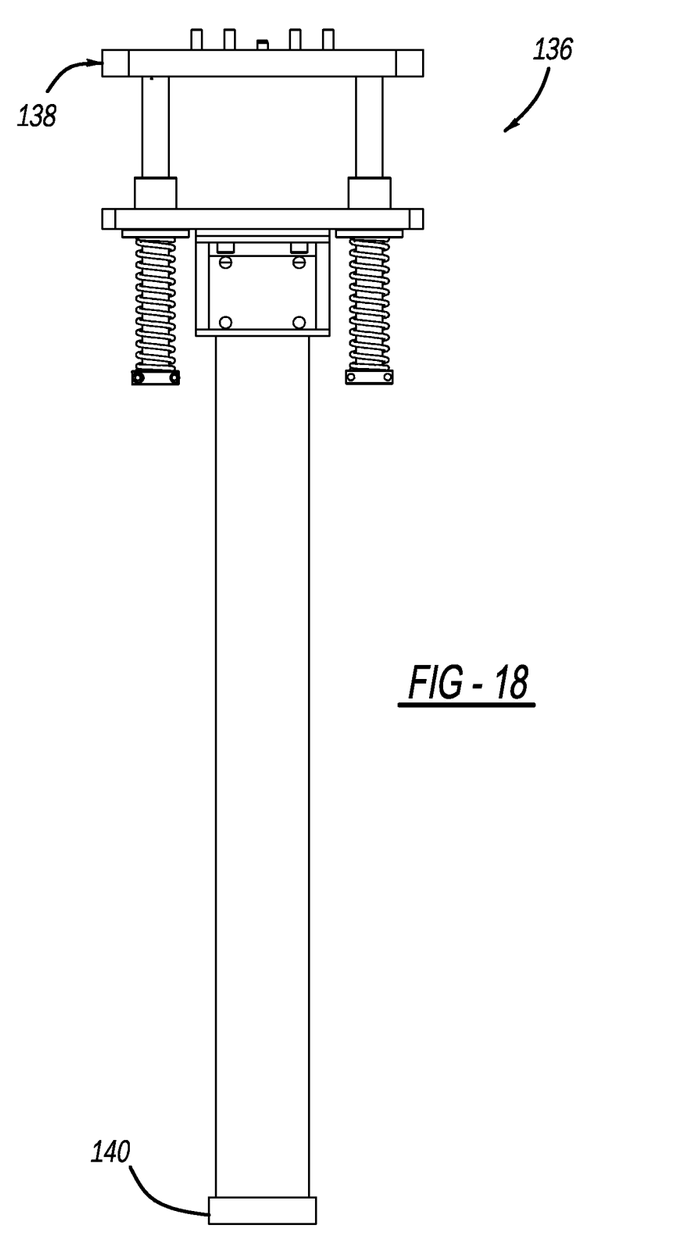
FIG. 18 is a front elevational view of the sealant distal arm tool, as shown in FIGS. 16-17.

With reference to FIG. 1, the RMV 100 includes a vehicle 101, a control system 104, an electrical power source 106, a multi-axis robot 110, an optical system 112, and a location translator 114. The RMV 100 may further include a maintenance module 108. The RMV 100 may have a front edge 115, a right side edge 116, a left side edge 118, and a rear edge 120. The multi-axis robot 110 may be disposed along the front edge 115, the right side edge 116, the left side edge 118, and/or the rear edge 120 of the RMV 100. The work area 122 of the multi-axis robot 110 may be disposed adjacent to the front edge 115, the right side edge 116, the left side edge 118, and/or the rear edge 120.

Where the road maintenance material 124 of the RMV 100 includes a plurality of traffic cones, as shown in FIGS. 2-5 and 13-15, the RMV 100 may have the clamping distal arm tool 126 disposed on a terminal end of the multi-axis robot 110. The clamping distal arm tool 126 may include a first clamping member 128 and a second clamping member 130 actuated along a substantially horizontal axis A of the clamping distal arm tool 126. As shown in FIGS. 6-9, each of the first clamping member 128 and the second clamping member 130 may include a vertical clamp 132 and a horizontal clamp 134.

Where the road maintenance material 108 of the RMV 100 includes a sealant, as shown in FIGS. 10-15, the RMV 100 may have the sealant distal arm tool 136 disposed on a terminal end of the multi-axis robot 110. As shown in FIGS. 16-18, the sealant distal arm tool 136 may include a spring actuated dampener 138 and a hose/nozzle support tube 140. With reference to FIGS. 10-15, the maintenance module 108 may further include an airstream module 141 disposed along the front edge 115 of the RMV 100. Advantageously, to enhance accuracy of the optical system 112, a shroud 142 may be disposed adjacent to the work area 122 of the multi-axis robot 110 having a sealant distal arm tool 136. Desirably, the shroud 142 may militate against inaccurate readings from the optical system 112 due to changes in lighting.

Figure 19:
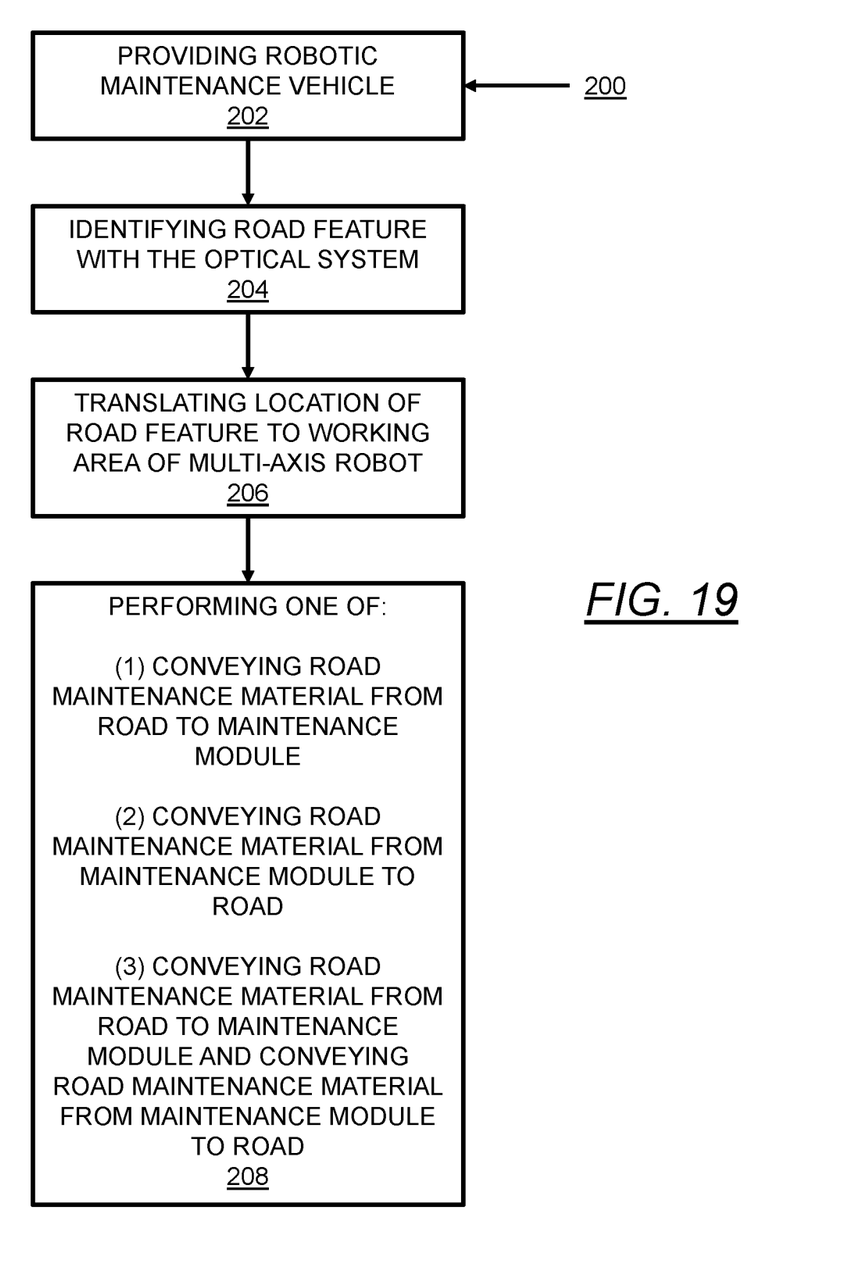
FIG. 19 is a flowchart of a method for using the RMV, according to one embodiment of the present disclosure.

In certain embodiments, as shown in FIG. 19, the present technology may be used according to a method 200 of using the RMV 100. The method 200 may include a step 202 of providing an RMV 100 having a propulsion system 102, a control system 104, an electrical power source 106, a maintenance module 108, a multi-axis robot 110, an optical system 112, and a location translator 114. The method 200 may include a step 204 of identifying a road feature with the optical system 112. The method may include another step 206 of translating the location and/or size information of the road feature to the working area 122 of the multi-axis robot 110. Then, the method 200 may include a step 208 of performing one of (1) conveying the road maintenance material 124 from the road to the maintenance module 108, (2) conveying the road maintenance material 124 from the maintenance module 108 to the road, and (3) conveying the road maintenance material 124 from the road to the maintenance module 108 and conveying the road maintenance material 124 from the maintenance module 108 to the road.

Advantageously, an RMV base unit having a multi-axis robot 110, a control system 104, an electrical power source 106, an optical system 112, a location translator 114, and a maintenance module 108 that can accept various modules such as a crack sealer, a pothole filler, a painter, a cone setter, a cone picker, a post setter, a sign setter, a vacuum cleaner, a core sampler, and a reflector inserter may enhance highway maintenance by increasing efficiency and lowering costs.

While certain representative embodiments and details have been shown for purposes of illustrating the invention, it will be apparent to those skilled in the art that various changes can be made without departing from the scope of the disclosure, which is further described in the following appended claims.

What is claimed is:

1. A robotic maintenance vehicle for road crack sealing, comprising:
   a vehicle platform;
   an electrical power source;
   a maintenance module configured to hold a road maintenance material that the multi-axis robot is configured to perform a road maintenance operation by conveying the road maintenance material from the maintenance module to the road, wherein the road maintenance material includes a sealant;
   a multi-axis robot powered by the electrical power source, the multi-axis robot configured to perform a road maintenance operation, wherein the multi-axis robot includes a distal arm tool in fluid communication with the road maintenance material and configured to dispense the sealant, and the distal arm tool is configured to follow a contour of the road as the robot moves the distal arm tool across a surface of the road;
   an optical system configured to identify a road feature including a crack in the surface of the road;
   an airstream module configured to provide an airstream to blow debris from one of the road and the crack in the surface of the road;
   a location translator spaced apart from the multi-axis robot, the location translator including a linear encoder, the location translator configured to translate a location of the road feature identified by the optical system to a working area of the multi-axis robot; and
   a control system configured to control the functions of the robotic maintenance vehicle, including the multi-axis robot, the optical system, and the location translator to seal the crack in the surface of the road with the sealant from the maintenance module.

2. The robotic maintenance vehicle of claim 1, wherein the vehicle platform includes one of: (1) a trailer; (2) a truck including a propulsion system configured to propel the robotic maintenance vehicle, the propulsion system includes one of an internal combustion engine, an electric motor, and an internal combustion engine and an electric motor, and an operator cab for an operator to control the vehicle; and (3) a truck having a trailer coupled to the truck.

3. The robotic maintenance vehicle of claim 1, wherein:
   the electrical power source includes an electric generator;
   the control system includes one of a programmable logic controller and a computer; and
   the optical system includes a digital camera.

4. The robotic maintenance vehicle of claim 1, wherein the multi-axis robot has a work area disposed adjacent to one of a front side of the vehicle, a right side of the vehicle, a left side of the vehicle, and a rear end of the vehicle.

5. The robotic maintenance vehicle of claim 1, further comprising:
   another multi-axis robot powered by the electrical power source and controlled by the control system, the another multi-axis robot configured to (1) convey the road maintenance material from the road to the maintenance module, (2) convey the road maintenance material from the maintenance module to the road, or (3) convey the road maintenance material from the road to the maintenance module and convey the road maintenance material from the maintenance module to the road;
   wherein the optical system is configured to identify another road feature;
   wherein the location translator is configured to translate a location of the another road feature identified by the optical system to a working area of the another multi-axis robot.

6. The robotic maintenance vehicle of claim 1, wherein the optical system further comprises an optical mapping module configured to calculate an operation speed of the multi-axis robot and a pump rate of the road maintenance material, thereby controlling a rate of dispensing of the road maintenance material and an amount of the road maintenance material dispensed based on a size of the crack.

7. The robotic maintenance vehicle of claim 6, wherein the optical mapping module includes:
   a shroud configured to substantially enclose the crack in the surface of the road; and
   a member selected from a group consisting of a laser, a digital camera, and combinations thereof.

8. The robotic maintenance vehicle of claim 6, wherein the optical mapping module is further configured to record the crack and analyze measurements of the crack based on the recording, the measurements including a width of the crack, a length of a crack, a depth of the crack, and a volume open space within the crack, and the location translator is further configured to relay the location, the orientation, and the measurements of the crack from the optical mapping module to the multi-axis robot.

9. The robotic maintenance vehicle of claim 1, wherein the distal arm tool further includes a nozzle, the nozzle including a hollow cylinder that includes a predetermined length.

10. The robotic maintenance vehicle of claim 1, wherein the airstream module includes an oscillating air knife coupled to one of the vehicle and the multi-axis robot.

11. A method of using a robotic maintenance vehicle for road crack sealing, comprising:
   providing a robotic maintenance vehicle including
      a vehicle platform,
      an electrical power source,
      a maintenance module configured to hold a road maintenance material that the multi-axis robot is configured to perform a road maintenance operation by conveying the road maintenance material from the maintenance module to the road, wherein the road maintenance material includes a sealant,
      a multi-axis robot powered by the electrical power source, the multi-axis robot configured to perform a road maintenance operation, wherein the multi-axis robot includes a distal arm tool in fluid communication with the road maintenance material and configured to dispense the sealant, and the distal arm tool is configured to follow a contour of the road as the robot moves the distal arm tool across a surface of the road,
      an optical system configured to identify a road feature including a crack in the surface of the road, an airstream module configured to provide an airstream to blow debris from one of the road and the crack in the surface of the road, a location translator spaced apart from the multi-axis robot, the location translator including a linear encoder, the location translator configured to translate a location of the road feature identified by the optical system to a working area of the multi-axis robot, and a control system configured to control the functions of the robotic maintenance vehicle, including the multi-axis robot, the optical system, and the location translator; and performing the road maintenance operation with the robotic maintenance vehicle to seal the crack in the surface of the road with the sealant from the maintenance module.

12. The method of claim 11, wherein performing the road maintenance operation includes at least one of the steps of causing the robotic maintenance vehicle to move with respect to the road;

blowing the airstream from the airstream module toward the surface of the road;

scanning the surface of the road with the optical system to identify a crack in the surface of the road;

determining the location of the crack within the working area of the multi-axis robot with the location translator;

moving the distal arm tool to the location of the crack within the working area of the multi-axis robot; and dispensing the sealant from the distal arm tool into the crack in the surface of the road.

13. The method of claim 12, further comprising the step of causing the distal arm tool to follow a contour of the road as the multi-axis robot moves the distal arm tool across the surface of the road.

14. The method of claim 12, further comprising the step of causing the distal arm tool to follow the crack in the surface of the road within the working area of the multi-axis robot.

15. The method of claim 12, further comprising at least one of the steps of determining one of a width, a depth, and a length of the crack; and recording one of the width, the depth, and the length of the crack.

16. The method of claim 12, further comprising at least one of the steps of determining a volume open space within the crack; and recording the volume open space within the crack.

17. The method of claim 12, further comprising at least one of the steps of detecting an undesired object in the work area of the multi-axis robot;

alerting an operator that the undesired object was detected in the work area of the multi-axis robot; and causing an emergency stopping action of at least one function of the robotic maintenance vehicle.

* * * * *